(12) United States Patent
Magoci et al.

(10) Patent No.: US 10,005,426 B2
(45) Date of Patent: Jun. 26, 2018

(54) COMBINATION FUEL MONITORING AND ANTI-THEFT DEVICE AND SYSTEM

(71) Applicants: Jurica Magoci, Zupanja (HR); Igor Hristov, Skopje (MK)

(72) Inventors: Jurica Magoci, Zupanja (HR); Igor Hristov, Skopje (MK)

(*) Notice: Subject to any disclaimer, the term of this patent is extended or adjusted under 35 U.S.C. 154(b) by 129 days.

(21) Appl. No.: 15/006,197

(22) Filed: Jan. 26, 2016

(65) Prior Publication Data

US 2016/0214570 A1 Jul. 28, 2016

Related U.S. Application Data

(60) Provisional application No. 62/108,352, filed on Jan. 27, 2015.

(51) Int. Cl.
| | |
|---|---|
| *B60R 25/01* | (2013.01) |
| *G07C 5/08* | (2006.01) |
| *G07C 5/00* | (2006.01) |

(52) U.S. Cl.
CPC .............. *B60R 25/01* (2013.01); *G07C 5/008* (2013.01); *G07C 5/08* (2013.01)

(58) Field of Classification Search
CPC ....................................................... B60R 25/01
USPC ..................................................... 340/426.24
See application file for complete search history.

(56) References Cited

U.S. PATENT DOCUMENTS

| | | | |
|---|---|---|---|
| 3,056,294 A | | 10/1962 | Brown et al. |
| 3,873,966 A | * | 3/1975 | Tanner ................ B60R 25/1001 200/61.44 |
| 3,878,507 A | * | 4/1975 | Medlock ............... B60K 15/04 200/61.44 |
| 4,010,444 A | * | 3/1977 | Shah ..................... B60R 25/101 180/287 |
| 4,700,579 A | | 10/1987 | Hall |
| 5,303,842 A | | 4/1994 | Harp et al. |
| 5,992,473 A | | 11/1999 | Hammonds |
| 6,079,380 A | | 6/2000 | Jorgensen et al. |
| 6,230,558 B1 | | 5/2001 | Miwa et al. |
| 6,252,499 B1 | | 6/2001 | Gerdtz et al. |
| 6,289,947 B1 | | 9/2001 | Heimbrodt et al. |
| 7,040,360 B2 | | 5/2006 | Watson |
| 7,159,625 B1 | | 1/2007 | Klutts |
| 7,760,085 B2 | * | 7/2010 | Lertora .................. B60K 15/04 340/539.31 |
| 8,181,678 B2 | | 5/2012 | Ando et al. |
| 8,744,669 B1 | | 6/2014 | Peraza |
| 2009/0289757 A1 | | 11/2009 | Ballard |
| 2011/0031245 A1 | * | 2/2011 | Wholey ............. B60K 15/0403 220/86.3 |
| 2014/0034176 A1 | | 2/2014 | Watson et al. |
| 2015/0120515 A1 | * | 4/2015 | Stevenson ............... G01F 23/14 705/28 |

* cited by examiner

*Primary Examiner* — Qutbuddin Ghulamali
(74) *Attorney, Agent, or Firm* — Stephen T. Scherrer; Monique A. Morneault; Scherrer Patent & Trademark Law, P.C.

(57) ABSTRACT

The present disclosure relates to a combination fuel monitoring and anti-theft device and system for monitoring fuel load and preventing fuel theft. The device and system provide real-time information, relating to fuel load and consumption, which is transmittable to a remote receiver.

11 Claims, 6 Drawing Sheets

COMBINATION FUEL MONITORING AND ANTI-THEFT DEVICE AND SYSTEM

TECHNICAL FIELD

The present disclosure relates to a device, system and method for monitoring fuel level and consumption. More specifically, the present device is a combination fuel monitoring and anti-theft device (a "smart" fuel cap) and system, which can transmit data relating to fuel levels and consumption to a remote receiver. The present device is advantageous is that it is powered and operates independently from the vehicle operating system to which it is installed, and does not require modification of existing fuel tanks for installation.

BACKGROUND

There are about 14 million semi-tractor trailers or 18 wheelers driving across America and Canada daily. An average class A rig in the trucking industry spends on average up to $10,000 monthly on fuel and the damage caused by fuel theft runs around $1740 per month, per truck resulting in around $8.3 billion in fuel theft/loss annually. Fuel theft, in the form of fuel alleged to be added but never reaching the fuel tank, and siphoning of fuel from fuel tanks, is a not a new problem. However, fuel theft has gained in importance in recent years particularly due to the increase in fuel prices combined with an increase in competition in the transportation industry. Commercial vehicle operators realize the increased need to control costs, including costs relating to fuel expenses, in order to be more competitive and profitable.

Commercial vehicle companies are typically operating with large trucks equipped with two-two hundred gallon tanks. These commercial vehicles leave the home base and can spend up to fifty days on the road, carrying company credits or fuel cards in order to purchase fuel while on the road. Dishonest vehicle operators have been known to abuse the filling process, by either making charges for fuel not actually added to the fuel tank, adding fuel to another accomplice vehicle, or even siphoning out fuel that was previously added and charged. Unscrupulous operators may work together, providing kickbacks to one another for the fuel theft. Because a vehicle spends so many days on the road, generally far away from the home office, it is very important for the fleet company owners to have real time information and control over the fueling process while their vehicles are out on the road.

Anti-siphoning devices are known. Many prior fuel measuring and anti-theft devices having built-in flow meters and anti-theft systems, which have attempted to monitor and contain the problem of fuel theft. While some anti-siphoning devices manage to solve the problem of removal or siphoning the fuel from the tank, and other devices measure the amount of fuel loaded into a tank, there is no real time data or communication available to remote receivers concerning fuel load. Thus, there is no way for commercial vehicle operators to monitor fuel load and usage from a location remote from the vehicle in real time.

With today's mobile electronic devices, it would be advantageous to a remote operator to receive data concerning fuel load and usage on a real time basis, wherein data is transmitted to a remote server, connected to an electronic device, including a computer, laptop, tablet or smartphone. In this manner, commercial vehicle operators and owners could better track fuel load and usage for fleet vehicles that may be thousands of miles away from the home office. Further, transmission of real time date permits the generation of reports that would be useful in tracking and assessing fuel usage and costs.

A need, therefore, exists for an improved device and system for improved monitoring of fuel addition and consumption, for not only theft prevention, but also for tracking and managing fuel costs. Specifically, a need exists for an improved combination fuel monitoring and anti-theft or anti-siphoning device and system, which transmits relevant data relating to fuel load and usage to a remote receiver.

A need further exists for a combination fuel monitoring and anti-theft device and system to be used as a retrofit unit in place of a standard fuel cap on an existing fuel tank.

A need further exists for a combination fuel monitoring and anti-theft device and system to replace a standard fuel cap without requiring additional modification to the fuel tank.

A need further exists for a fuel monitoring and anti-theft device and system that monitors fuel loading and unloading in real time, transmitting the data to remote receiver, including a computer or mobile electronic device, such as a laptop computer, tablet or smartphone such that the data is available for immediate review and use by an owner/operator.

A need further exists for a fuel monitoring and anti-theft device and system in the form of a smart fuel cap that monitors fuel loading and unloading transmitting the data from the device to a remote receiver, which can store the data and create desired reports.

A need further exists for a fuel monitoring and anti-theft device and system that is powered independent from a vehicle power and/or operating systems.

A need further exists for a fuel monitoring and anti-theft device and system that is quick and easy to install and uninstall from an existing fuel tank without modification to the fuel tank.

A need further exists for a fuel monitoring and anti-theft device and system with a built-in safety lock for secure attachment to an existing fuel tank.

Moreover, a need exists for fuel monitoring and anti-theft device and system that is tamper-resistant.

SUMMARY

A fuel monitoring and theft prevention device and system is provided, which measures and monitors fuel loading and consumption, and prevents the siphoning of fuel from the vehicle tank. The present fuel monitoring and theft prevention device and system is particularly useful for commercial vehicles, including semi-tractor trailers on long-haul trips, and provides a system for monitoring fuel load and consumption from a remote location, such as the vehicle's home base or headquarters. Additionally, the present device can be installed onto an existing fuel tank without special tools or modification to the fuel tank.

To this end, in an embodiment of the present invention, a device for monitoring the loading and consumption of fuel on a vehicle is provided, the device comprising a housing unit containing a combination fuel monitoring and anti-siphoning system.

In an embodiment, a fuel monitoring and anti-theft device for use with a fuel tank is provided. The device comprises a housing having a first section and a second section, the first section containing a fuel load monitoring assembly, the second section containing a data transmission assembly, wherein the fuel load monitoring assembly is operatively connected to the data transmission assembly to gather and provide data concerning fuel load and usage to a remote receiver to prevent fuel theft.

In yet another embodiment, a fuel monitoring system is provided. The fuel monitoring system comprises a housing configured for insertion into a fuel tank inlet, a flow meter assembly positioned within the housing, a sensor connected to the flow meter, the sensor adapted for receiving data relating to fuel load through the flow meter assembly, a processor operatively connected to the sensor, wherein the processor collects data from the sensor, a modem operatively connected to the processor for transmitting the data to a remote receiver.

In yet another embodiment, a combination fuel monitoring and anti-siphoning device configured for replacing the standard fuel cap on a fuel tank is provided. The device comprises a housing having a central intake passageway, a flow meter positioned within the central intake passageway through a center shaft, the flow meter operatively connected to at least one sensor for monitoring fuel intake, fuel level and fuel consumption, the sensor further connected to a processor/controller for receiving data from the sensor relating to the fuel load, wherein the processor/controller is further connected to a transmitter having an antenna for transmitting data to a remote receiver. The device further includes a power source for supplying power to the combination fuel monitoring and anti-siphoning device independent of a vehicle power and control system. The device also includes an anti-siphoning component disposed within the housing.

It is, therefore, an advantage and objective of the present disclosure to provide an improved combination fuel monitoring and anti-theft device and system capable of gathering and transmitting data relating to fuel load to a remote receiver in real time.

Another advantage and objective of the present disclosure is to provide an improved combination fuel monitoring and anti-theft device and system capable of gathering data relating to fuel addition, current fuel level and fuel consumption and transmitting the data to a remote receiver.

Another advantage and objective of the present disclosure is to provide an improved combination fuel monitoring and anti-theft device and system powered independently of the vehicle power and operating systems.

Another advantage and objective of the present disclosure is to provide an improved combination fuel monitoring and anti-theft device and system providing quick installation to, and removal from, an existing fuel tank without modification to the existing fuel tank.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure relates to a combination fuel monitoring and anti-theft device and system for preventing theft of fuel, while providing real-time information relating to fuel load and consumption that is transmittable to a remote receiver. The present device is particularly useful for large commercial vehicles, such as semi-tractor trailers, which are generally on the road for multiple weeks at a time. Alternatively, the present fuel monitoring and anti-theft device may also be useful for various other vehicle fuel tanks and stationary fuel storage tanks as well.

The combination fuel monitoring/anti-theft device 10 and system of the present disclosure is used primarily used to monitor both the fuel added to a tank and prevent unauthorized removal of fuel from a tank. Thus, the present device and system includes elements for monitoring, gathering and transmission of data relating to fuel loading and consumption, as well as, anti-siphoning features. As such, the device and system is designed to prevent both the type of theft where the fuel is removed from the tank after being loaded, as well as, where the fuel never reaches the tank, i.e., false readings on fuel loading. Thus, the present device 10 increases fuel efficiency, while reducing costs and losses from theft and misuse.

Figure 1:
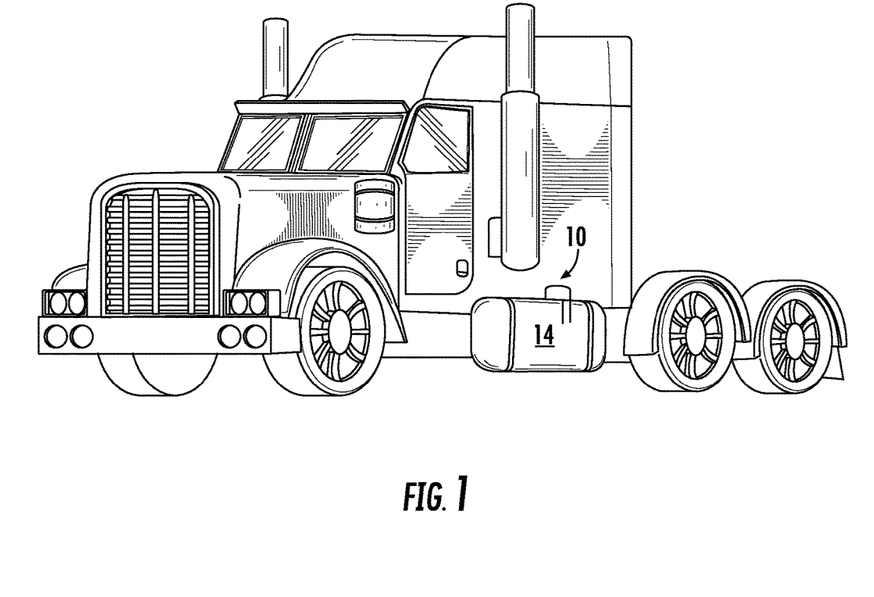
FIG. 1 illustrates a typical semi-tractor trailer showing one of two fuel tanks having a combination fuel monitoring and anti-theft device of the present disclosure.

Now referring to the figures, FIG. 1-6 illustrate a combination fuel monitoring and anti-theft device 10 and system of the present disclosure, which is capable of transmitting data relating to fuel load to a remote receiver. Specifically, FIG. 1 illustrates a typical semi-trailer truck 12 having a fuel tank system 14 generally including two fuel tanks (one is shown in this view) common to large commercial diesel vehicles, and incorporating the combination fuel monitoring/anti-theft device 10 and system of the present disclosure.

Figure 2:
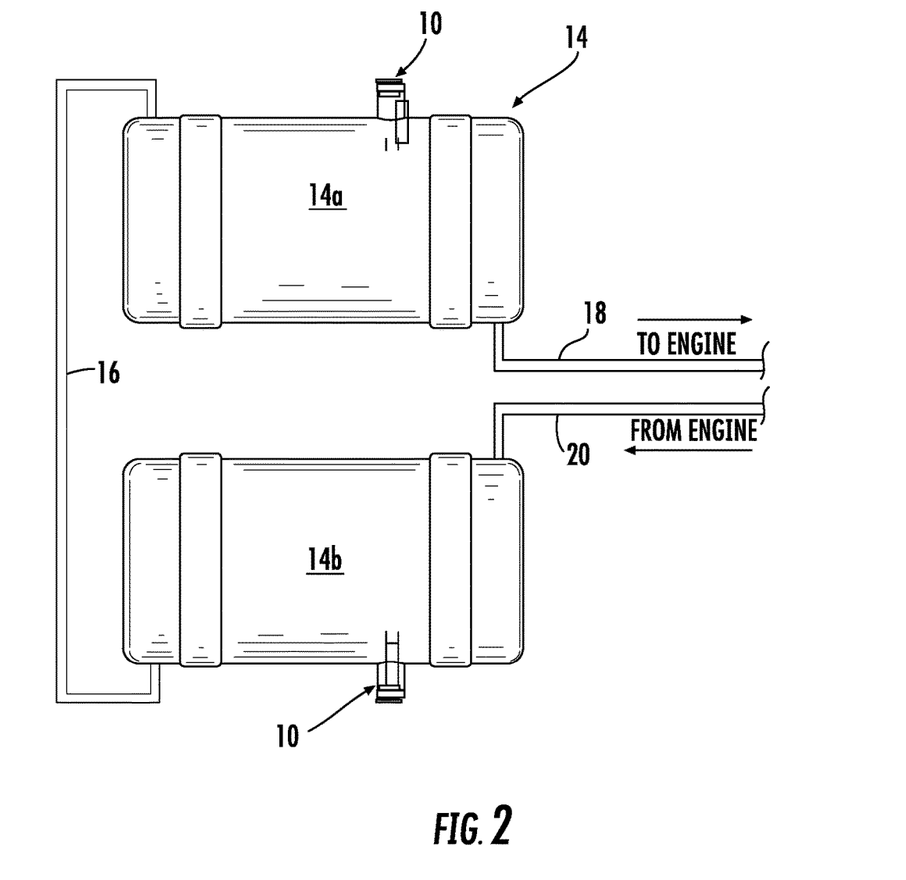
FIG. 2 illustrates a typical two tank fuel system commonly used on semi-tractor trailers, each fuel tank including the combination fuel monitoring and anti-theft device of the present disclosure.

FIG. 2 illustrates a possible arrangement of convention components of the fuel system 14 of a large commercial vehicle, including a semi-tractor trailer. A typical fuel tank system 14 includes a first fuel tank 14a and a second fuel tank 14b, with each tank being positioned in tandem on either side of the vehicle (not shown). A connecting line 16 provides for passage of fuel between the tanks, keeping the level of fuel within each tank the same to maintain an equal weight distribution and ensure all available fuel is used. The tanks further include a first fuel line 18 for providing fuel from the tank to the engine (not shown), and a second fuel line 20 for the return of unburned fuel from the engine to the tank. Because of the large capacity of both tanks (100-150 gallons each), and the variability of the amount of fuel present in each tank at a time, it would be advantageous to monitor actual fuel amount and consumption. Therefore, in order to monitor the amount of fuel added to and present within the tanks, and also to prevent theft of the fuel from the tanks, both tanks are fitted with the combination fuel monitoring/anti-theft device 10 of the present disclosure.

Figure 3:
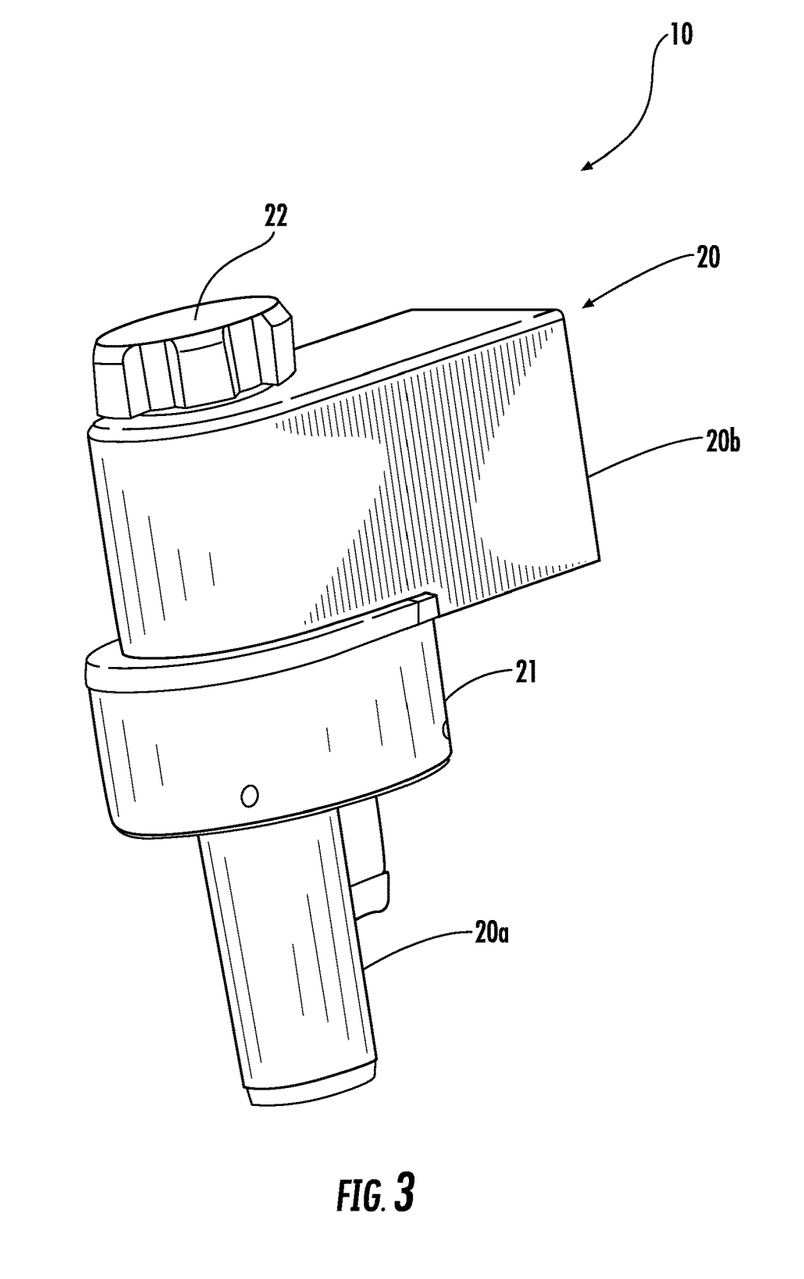
FIG. 3 illustrates a perspective view of an embodiment of the combination fuel monitoring and anti-theft device of the present disclosure.

FIG. 3 illustrates a perspective view of an embodiment of the present combination fuel monitoring and anti-theft device 10. Initially, the combination fuel monitoring/anti-theft device 10 includes a housing 20 having a tamper-proof fuel cap 22 at the top of the housing. The housing 20 can be constructed from any suitable material, including corrosion resistant metal or plastic. The housing 20 can have any shape, but is generally circular or rounded, as it is designed to fit within the spout or inlet port (not shown) of a fuel tank as a replacement for a standard fuel cap. The device 10 further includes an adapter 21 that permits a leak-proof fit of the device within the inlet port of a fuel tank.

Figure 4:
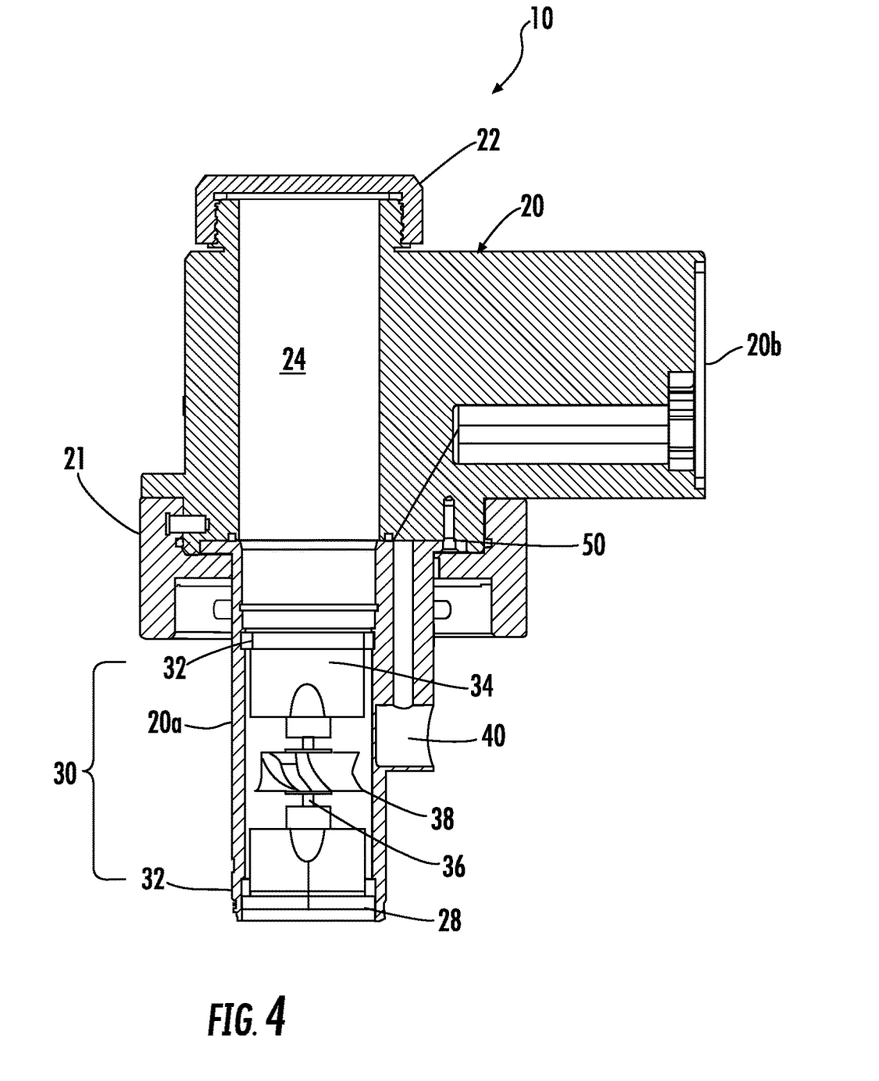
FIG. 4 illustrates a cut-away view of the combination fuel monitoring and anti-theft device of the present disclosure.

The housing 20 includes two sections, a first section 20a for receiving and measuring fuel, and a second section 20b containing components relating to the transmission of data concerning fuel load from the device to a remote server. As shown in the embodiments of FIGS. 3 and 4, the first section 20a of the housing has a generally cylindrical shape. When the device 10 is installed in place of a standard fuel cap, the first section 20a extends into the interior space of the tank. As will be discussed below, the second section 20b houses several components, including at least one sensor, a power source, antenna, controller/processor, and a transmission device, such as a modem, which all relate to the transmission of data from the device 10 to a remote server or receiver. The first section 20a further includes an anti-siphoning component 28.

As shown in FIG. 4, the first section 20a of the housing 20 includes an internal passageway 24 for receiving a fuel nozzle (not shown), which is accessible when the tamper-proof fuel cap 22 is removed. When the device 10 is installed replacing the standard fuel cap on a fuel tank, the passageway 24 extends into the interior space of the tank body (not shown). Fuel enters the passageway 24 and flows through the flow meter assembly 30 and anti-siphoning component 28 before reaching the interior space of the tank (not shown).

The flow meter assembly 30 of the device 10 is installed within the passageway 24 of the first section 20a of the housing where it cannot be removed. Flow meter assemblies are generally known in the art. In the present device 10, the flow-meter assembly 30 includes a set of stainless steel rings 32 positioned within the interior of the passageway 24, each ring having ceramic bearings 34 for engaging a tungsten carbide shaft 36 within the interior of the passageway. A paddlewheel rotor 38 connected to the shaft 36 rotates as fuel flows through the passageway 24 into the tank (not shown). At least one sensor 40 within the housing 20 connects with the rotor 38 and measures the flow rate of fuel into the tank.

The present device 10 not only monitors the fuel load into the tank through use of at least one sensor 40, but also includes an anti-siphoning component 28, which prevents the insertion of a siphoning tube into the interior space of the tank. Anti-siphoning components and systems are generally known and offered as original equipment or after-market items. The anti-siphoning component of the present device 10 includes a sieve 28 or anti-theft net that prevents entry of a siphoning device into the tank, facilitating unwanted removal of the fuel from the fuel tank. The sieve 28 acts as a protective barrier and prevents penetration into the interior space of the fuel tank. Thus, the present device 10 is designed to prevent both the type of theft where the fuel never reaches the fuel tank and where fuel is impermissibly extracted from the fuel tank.

Another important feature of the present fuel monitoring system is that the data gathered from the system relating to the fuel load and consumption can be transmitted in real time to a remote receiver, including a remote server, computer or mobile electronic device, such as a laptop computer, tablet or smartphone. Transmission of information may be wirelessly through Bluetooth, WI-FI, radio waves, or other wireless communication known to one skilled in the art. The appropriate data-receiving device is loaded with proprietary software useful for receiving the data, and providing the appropriate information and generating reports concerning fuel load, capacity, whether any fuel has been inappropriately removed, and overall operation of the device 10. The remote server can be a cloud-based server. In this way, vehicle owners, operators and companies can receive data in real time relating to fuel load. Using the software, data provided from the fuel monitoring system can also be used to calculate and determine fuel costs and potential savings.

Figure 5:
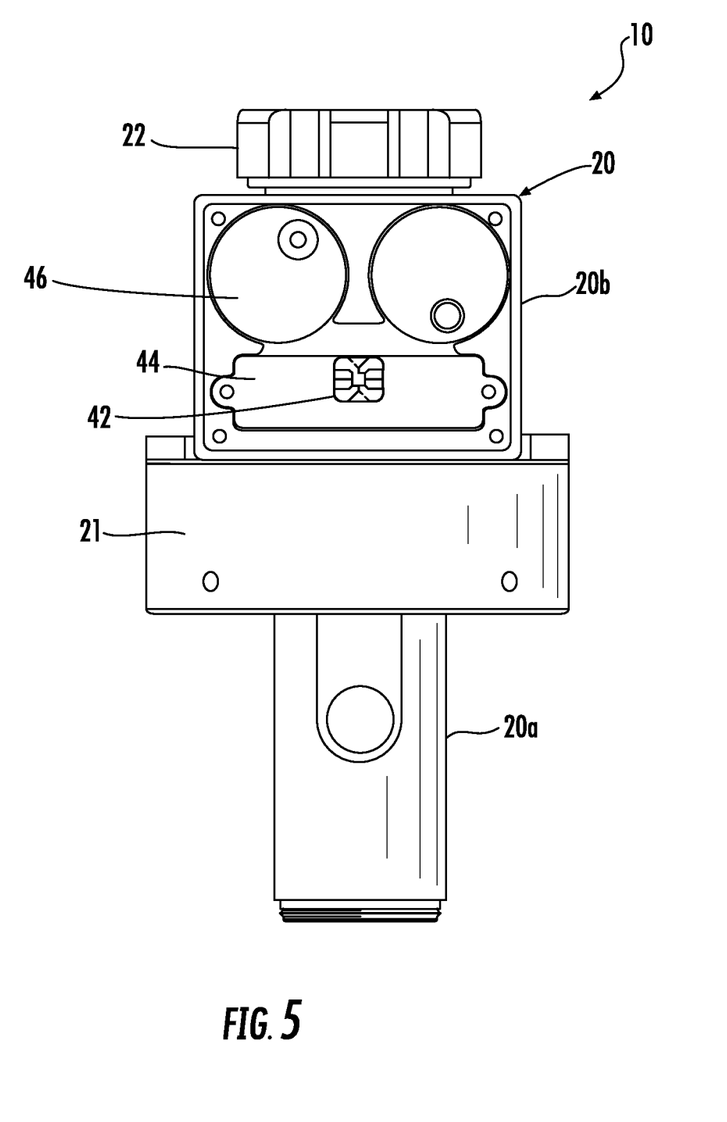
FIG. 5 illustrates an end view of a section of the housing of the combination fuel monitoring and anti-theft device of the present disclosure; and, FIG. 6 illustrates activation of the combination fuel monitoring and anti-theft device of the present disclosure, and specifically transmitting data from the device to a remoter receiver.

To order to send data relating to fuel load in real time from the device 10 to a remote receiver, the second section 20b of the housing 20 includes various components to accomplish the transfer of information, essentially operating as a smart fuel cap. FIG. 5, an end view of the second section 20b of the housing, illustrates the components of the data transmission feature of the present device, including a processor/controller (SIM card) 42, and a mobile connectivity modem 44 including a built-in antenna (not shown). Information is received and measured by at least one sensor 40, and transmitted to a remote receiver 100 (FIG. 6) through the modem 44 of the device 10. In one embodiment, the sensor 40 transmits readings concerning the flow of fuel through the flow meter assembly 30 into the tank to the processor/controller 42, which collects the data from the sensor. The processor/controller 42 transmits the data to a remote receiver 100 through the mobile connectivity modem 44. FIG. 5 further illustrates a battery pack 46. An additional advantage of the present device 10 is that by including its own, independent power supply 46 (such as a long-lasting lithium battery), the device does not require modification of, or connection to, the vehicle power system for operation.

Figure 6:
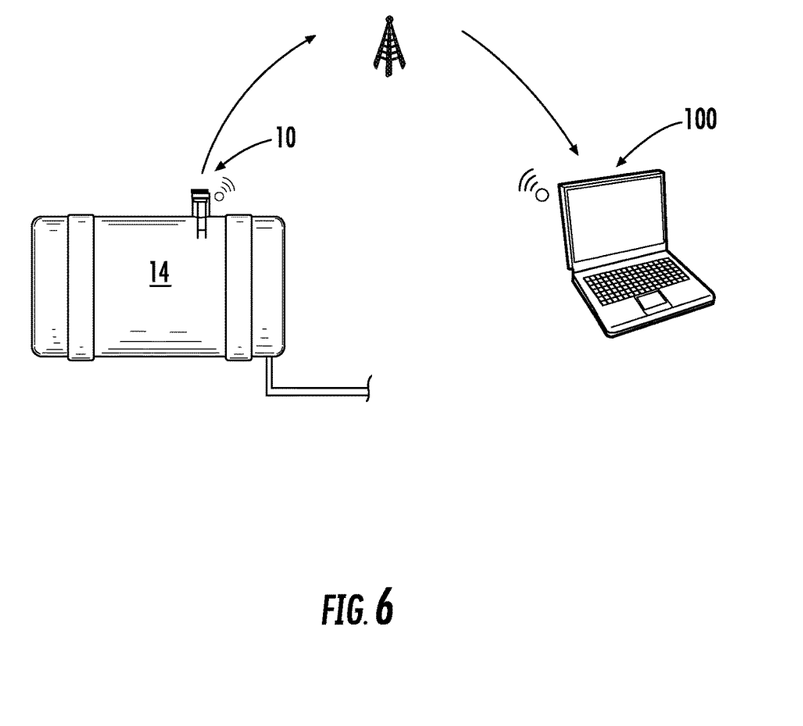

FIG. 6 illustrates transmission of information from the fuel monitoring device attached to a tank to the remote receiver 100. The remote receiver 100 can be in the form of a remote server, computer or any suitable mobile electronic device such as a laptop computer, tablet or smartphone. The present fuel monitoring device 10 and system provides advantages over prior systems in that it provides real time data relating to fuel load and consumption to remote users and operators. All the information collected from the sensors 40 are stored in the memory chip (not shown) of the device 10 and once per day (configurable parameter), the information is forwarded to the server 100. In this manner, owners and operators located at a home office, are able to monitor fuel load of vehicles out on the road in real time. In addition, each device 10 can be accessed, calibrated and reset over the internet from the home office, and all data collected from the device can be collected on demand.

Addition information that can be collected by the device 10 and transmitted to the remote receiver 100 includes: alarm when the rotor 38 begins moving; amount of litters/gallons passing thru the device; timestamp; GPS coordinates and parameters; alarm when the rotor 38 stops; alarm if the average rotor rotation is less than 50% of the total capacity. The information is useful for commercial vehicle operators and owners to monitor fuel load and consumption in real time for calculating fuel costs, and to detect potential fuel theft, while located remotely from the vehicle.

In addition, each component can be accessed, calibrated and reset remotely through an internet connection, and all data can be collected on individual demand. Thus, the fuel monitoring system, working in conjunction with the anti-siphoning component, enhances fuel savings and conservation within the fuel tank. The fuel monitoring system measures not only the volume of fuel loaded into each tank, but also measures the level of fuel within the tank at a given moment. The data generated from the fuel monitoring system is useful for calculating the overall expenses associated with fuel consumption, and assists in determining any potential theft of fuel from the tank.

The combination fuel monitoring and anti-theft device 10 of the present disclosure may be installed at the original manufacturer, or offered as an aftermarket retrofit to replace a standard fuel cap found on the fuel tank. An advantage of the present device 10 is that it is easily and quickly installed into a fuel tank inlet, replacing the standard fuel cap. For example, installation of the present device 10 simply involves removing the standard fuel cap found on each fuel tank, and threading the device into the fuel tank inlet. Once installed on the fuel tank, the housing 20 is secured to the fuel tank using any suitable locking and tamper evident locking assembly 50, which inhibits removal of the device 10. The locking assembly 50 includes a standard bolt locking system. The locking assembly 50 may further include a two key lock, similar to a door lock. The device 10 may also include any number of additional sensors to alert the fleet owner that the device has been tampered with and/or removed.

Although the combination fuel monitoring and anti-theft device and system of the present disclosure is useful for use with vehicle fuel tanks, particularly large commercial vehicle fuel tanks, it is to be understood that the present device and system may be used equally well on stationary fuel tanks, chemical storage tanks, or any other tank where monitoring its contents would be advantageous.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A fuel monitoring and anti-theft device for use with a fuel tank, the device comprising:
    a housing having a first section and a second section;
    the first section containing an anti-siphoning component and a fuel load monitoring assembly comprising a flow meter assembly and at least one sensor operatively connected to the flow meter assembly for detecting fuel loading passing through the flow meter assembly;
    the second section containing a data transmission assembly;
    wherein the fuel load monitoring assembly is operatively connected to the data transmission assembly to collect and transmit real time fuel loading and usage data to a remote cloud-based server and forwarded to remote users and operators.

2. The fuel monitoring and anti-theft device of claim 1, wherein the housing includes a locking fuel cap.

3. The fuel monitoring and anti-theft device of claim 1, wherein the housing is configured for insertion into a fuel tank inlet and replacing a standard fuel cap.

4. The fuel monitoring and anti-theft device of claim 1, wherein the housing includes at least one sensor for indicating whether the device is present within or removed from the fuel tank inlet.

5. The fuel monitoring and anti-theft device of claim 1, wherein the first section includes an internal passageway for receiving a fuel load.

6. The fuel monitoring and anti-theft device of claim 1, wherein the internal passageway includes a top section and a bottom section, wherein the top section is adapted for receiving the locking fuel cap.

7. The fuel monitoring and anti-theft device of claim 1, wherein the flow meter assembly is contained within the internal passageway.

8. The fuel monitoring and anti-theft device of claim 1, wherein the data transmission assembly includes a processor/controller for receiving data relating to fuel load from the at least one sensor.

9. The fuel monitoring and anti-theft device of claim 8, wherein the data transmission assembly further includes a modem having a built-in antenna for transmitting the data from the processor/controller to a remote cloud-based receiver.

10. The fuel monitoring and anti-theft device of claim 1, wherein the anti-siphoning component is positioned within the first section of the housing.

11. The fuel monitoring and anti-theft device of claim 1, wherein the anti-siphoning component is a sieve.

* * * * *